US008571090B2

(12) United States Patent
Arviv et al.

(10) Patent No.: US 8,571,090 B2
(45) Date of Patent: *Oct. 29, 2013

(54) TECHNIQUE FOR SEARCHING FOR A PREAMBLE SIGNAL IN A SPREAD SPECTRUM USING A FAST HADAMARD TRANSFORM

(75) Inventors: Eliahou Arviv, Modin (IL); Daniel Briker, Kfar Saba (IL); Gennady Zilberman, Hod ha Sharon (IL)

(73) Assignee: Agere Systems LLC, Allentown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/494,076

(22) Filed: Jun. 12, 2012

(65) Prior Publication Data
US 2012/0250732 A1 Oct. 4, 2012

Related U.S. Application Data

(63) Continuation of application No. 12/181,624, filed on Jul. 29, 2008, now Pat. No. 8,228,971.

(51) Int. Cl.
*H04B 1/00* (2006.01)

(52) U.S. Cl.
USPC ........... 375/150; 375/147; 375/343; 375/347; 375/149; 375/152; 375/140; 375/148

(58) Field of Classification Search
USPC ......... 375/150, 147, 343, 347, 149, 152, 140, 375/148
See application file for complete search history.

(56) References Cited

U.S. PATENT DOCUMENTS

| 5,644,591 | A | 7/1997 | Sutton |
| 5,784,293 | A | 7/1998 | Lipa |
| 6,363,108 | B1 | 3/2002 | Agrawal et al. |
| 6,567,482 | B1 | 5/2003 | Popovic' |
| 6,765,953 | B1 | 7/2004 | Harms et al. |
| 6,771,688 | B1 | 8/2004 | Lee et al. |
| 6,798,758 | B1 | 9/2004 | Chun et al. |
| 6,850,507 | B1 | 2/2005 | Ok |

(Continued)

FOREIGN PATENT DOCUMENTS

EP 1 189 357 A1 3/2002

OTHER PUBLICATIONS

Non-Final Office Action; Mailed Jun. 17, 2011 for corresponding U.S. Appl. No. 12/181,624.

(Continued)

*Primary Examiner* — Kenneth Lam
(74) *Attorney, Agent, or Firm* — Mendelsohn, Drucker & Dunleavy, P.C.; David L. Cargille; Steve Mendelsohn

(57) ABSTRACT

In one embodiment, a method for demodulating and searching for a preamble signal containing a complex phasor signal is disclosed. The complex phasor is demodulated using a phasor-rotated fast transformer. A received signal is correlated with a spreading code to produce a correlated signal. The correlated signal is coherently accumulated to produce a coherently accumulated signal. A first phasor-rotated signal transformation is performed on a real component of the coherently accumulated signal, and a second phasor-rotated signal transformation is performed on an imaginary component of the coherently accumulated signal. Finally, the signal power of the transformed real and imaginary components of the coherently accumulated signal is determined.

18 Claims, 8 Drawing Sheets

(56) References Cited

U.S. PATENT DOCUMENTS

| | | | |
|---|---|---|---|
| 6,907,091 B2 | 6/2005 | Lee | |
| 7,010,559 B2 | 3/2006 | Rawlins et al. | |
| 7,103,084 B2 | 9/2006 | Jang et al. | |
| 7,177,345 B2 | 2/2007 | Kim | |
| 7,200,629 B2 | 4/2007 | Medlock | |
| 7,254,160 B2* | 8/2007 | Kawamoto et al. | 375/148 |
| 7,257,097 B2 | 8/2007 | Jung | |
| 7,301,921 B2 | 11/2007 | Heo | |
| 8,228,971 B2* | 7/2012 | Arviv et al. | 375/147 |
| 2001/0007110 A1 | 7/2001 | Shoji | |
| 2001/0017881 A1 | 8/2001 | Bhatoolaul et al. | |
| 2001/0046205 A1 | 11/2001 | Easton et al. | |
| 2002/0114294 A1 | 8/2002 | Toskala et al. | |
| 2002/0114297 A1 | 8/2002 | Karna et al. | |
| 2002/0136333 A1 | 9/2002 | Lee | |
| 2003/0058972 A1 | 3/2003 | Iochi | |
| 2003/0069044 A1 | 4/2003 | Yotsumoto | |
| 2003/0142686 A1 | 7/2003 | Kim | |
| 2004/0032839 A1 | 2/2004 | Kaewell, Jr. et al. | |
| 2004/0132443 A1 | 7/2004 | Klein et al. | |
| 2004/0157602 A1 | 8/2004 | Khawand | |
| 2004/0264550 A1 | 12/2004 | Dabak | |
| 2005/0002361 A1 | 1/2005 | Dick et al. | |
| 2005/0047347 A1 | 3/2005 | Lee et al. | |
| 2005/0047530 A1* | 3/2005 | Lee et al. | 375/343 |
| 2005/0164708 A1 | 7/2005 | Gabriel et al. | |
| 2005/0271025 A1 | 12/2005 | Guethaus et al. | |
| 2006/0126573 A1 | 6/2006 | Dick et al. | |
| 2006/0269024 A1 | 11/2006 | Dominique et al. | |
| 2007/0064665 A1 | 3/2007 | Zhang et al. | |
| 2007/0165567 A1 | 7/2007 | Tan et al. | |
| 2007/0211671 A1* | 9/2007 | Cha | 370/335 |
| 2007/0230590 A1 | 10/2007 | Choi et al. | |
| 2008/0101306 A1 | 5/2008 | Bertrand et al. | |
| 2009/0135800 A1 | 5/2009 | McPherson | |

OTHER PUBLICATIONS

Non-Final Office Action; Mailed Nov. 23, 2001 for corresponding U.S. Appl. No. 12/181,624.

Notice of Allowance; Mailed Mar. 14, 2012 for corresponding U.S. Appl. No. 12/181,624.

Eun-Sun Jung et al., "Design of High-Speed Preamble Searcher for RACH Preamble Structure in WCDMA Reverse Link Receiver," 2004, IEEE, pp. 481-484.

Mayowa Kassim Aregbesola, "Code Acquisition in DS-CDMA Systems Optimization and DSP Implementation," Thesis Presented at King Fahd University of Petroleum & Minerals, Dhahran, Saudi, Arabia, May 6, 2005, 6 pages.

3GPP Organisational Partners, "3rd Generation Partnership Project; Technical Specification Group Radio Access Network; Physical Channels and Mapping of Transport Channels onto Physical Channels (FDD) (Release 7)," http://www.3gpp.org, 3GPP TS 25.211 V7.0.0, Valbonne, France, Mar. 2006, pp. 1-50.

3GPP Organisational Partners, "3rd Generation Partnership Project; Technical Specification Group Radio Access Network; Spreading and Modulation (FDD) (Release 7)," http://www.3gpp.org, 3GPP TS 25.213 V7.0.0, Valbonne, France, Mar. 2006, pp. 1-32.

"Proposal for RACH Preambles," TSG-RAN Working Group 1 Meeting #6; Espoo, Finland; Jul. 13-16, 1999; p. 1-26.

U.S. Appl. No. 09/665,511, filed Sep. 19, 2000; 16 pages.

* cited by examiner

106

TECHNIQUE FOR SEARCHING FOR A PREAMBLE SIGNAL IN A SPREAD SPECTRUM USING A FAST HADAMARD TRANSFORM

CROSS-REFERENCE TO RELATED APPLICATIONS

This is a continuation of co-pending application Ser. No. 12/181,624, filed on Jul. 29, 2008, the teachings of which are incorporated herein by reference.

BACKGROUND OF THE INVENTION

1. Field of the Invention

The present invention relates to a spread-spectrum mobile communication system, and, more particularly, to techniques for searching for a preamble signal in a W-CDMA system.

2. Description of the Related Art

The Wideband Code-Division Multiple Access (W-CDMA) transmission protocol is well-known for use in mobile communications systems, and preamble detection in a W-CDMA system is similarly well-known. For example, one embodiment of a conventional preamble detector implementation is shown in 3GPP TSGR1 #6 (99) 893, entitled "Proposal for RACH Preambles," the teachings of which are incorporated herein by reference in their entirety. A segmented preamble detector structure using sub-correlations instead of 4096-chip coherent integration may also be employed, as described in the paper entitled "Design of High-Speed Preamble Searcher for RACH Preamble Structure in WCDMA Reverse Link Receiver" by Eun-Sun Jung et al., published in IEICE Transactions (89-B(11): 2990-2997 (2006)); as well as in U.S. Pat. No. 7,103,084, issued Sep. 5, 2006; U.S. Pat. No. 6,907,091, issued Jun. 14, 2005; U.S. patent application Ser. No. 09/665,511, filed Sep. 19, 2000 by Lee et al.; and U.S. patent application Ser. No. 09/664,646, filed Sep. 19, 2000; all of which are hereby incorporated by reference in their entirety.

SUMMARY OF THE INVENTION

An exemplary embodiment of the invention provides a system and method for demodulating and searching for a preamble signal modulated with a complex phasor signal. In accordance with certain embodiments of the invention, phasor demodulation is performed within a modified Walsh-Hadamard transformer, such that complex-by-complex correlation is unnecessary. An exemplary embodiment of the invention further provides two modified Walsh-Hadamard transforms—one for transforming and demodulating the real component of the complex preamble signal and one for transforming and demodulating the imaginary component of the complex preamble signal.

Thus, in a first embodiment, the invention is a method for signal processing in a spread-spectrum communication system. The method comprises: correlating a received signal with a spreading code to produce a correlated signal; coherently accumulating the correlated signal to produce a coherently accumulated signal; performing a first phasor-rotated signal transformation on a real component of the coherently accumulated signal; performing a second phasor-rotated signal transformation on an imaginary component of the coherently accumulated signal; and determining signal powers of the transformed real and imaginary components of the coherently accumulated signal.

In another embodiment, the invention is a signal processor, comprising: (1) a correlation unit configured to correlate a received signal with a spreading code to produce a correlated signal; (2) a coherent accumulator configured to coherently accumulate the correlated signal to produce a coherently accumulated signal; (3) one or more transform processors configured to (i) transform a real component of the coherently accumulated signal to produce a first phasor-rotated transformed signal corresponding to the real component and (ii) transform an imaginary component of the coherently accumulated signal to produce a second phasor-rotated transformed signal corresponding to the imaginary component; and (4) an energy calculator configured to determine signal powers of the first and second phasor-rotated transformed signals.

In yet another embodiment, the invention is a signal processor, comprising one or more preprocessing elements configured to preprocess a received phasor-rotated signal to produce a preprocessed phasor-rotated signal; and a transform element configured to apply a phasor-rotated transform to the preprocessed phasor-rotated signal to produce a phasor-derotated, transformed output signal.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 1:
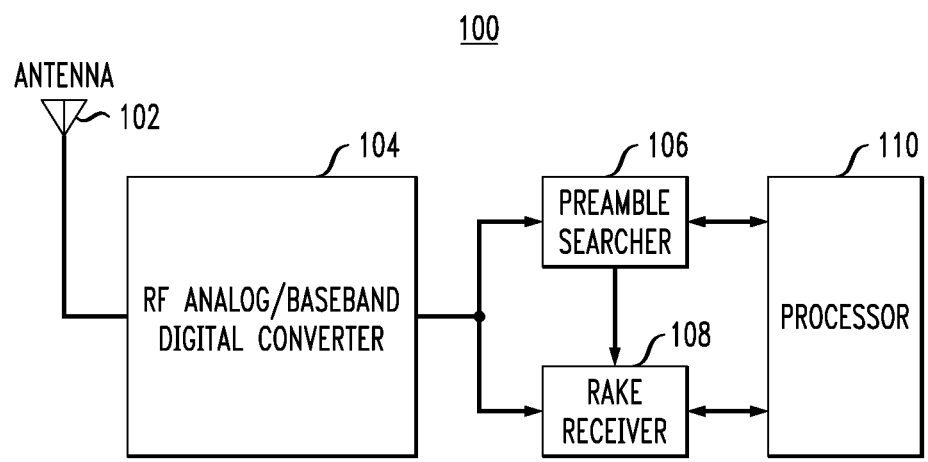
FIG. 1 is a block diagram illustrating a receiver of a base station in a mobile communication system.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Generally, a Wideband Code-Division Multiple Access (W-CDMA) mobile communication system is made up of at least a mobile station and a base station. A W-CDMA system employs pseudo-noise ("PN") spreading codes, known as "preamble scrambling codes," to allow the base station to identify transmissions directed to it. The base station typically selects four preamble scrambling codes from among 8192 possible preamble scrambling codes, although the number of preamble scrambling codes selected may be less than four and may be as high as sixteen. In order initially to establish a communication channel between the mobile station and the base station, the base station broadcasts, on a common broadcast channel, its selected preamble scrambling codes to the mobile station. The mobile station uses this information to create and transmit a known preamble sequence on an uplink access channel that is monitored by a receiver at the base station. The base station receiver detects the known preamble sequence and uses it for functions such as synchronizing the receiver timing with the received signal from the mobile station and estimating the round-trip delay between the mobile station and base station.

A random-access transmission procedure may be employed to enable multiple mobile stations to share the same physical channel in establishing communications with a base station of a given cell. For example, the Random Access Channel (RACH) in a W-CDMA Universal Mobile Telecommunications System ("UMTS") Terrestrial Radio Access Network ("UTRAN") is a common uplink transport channel that carries one or more preamble sequences and one or more message parts. The random-access transmission may be based on a Slotted ALOHA approach with fast acquisition indication. In Slotted ALOHA, a mobile station may initiate the random-access transmission at the beginning of a number of well-defined time intervals, known as access slots. There are 15 access slots per two frames, and the access slots may be spaced 5120 chips apart. Information on what access slots are available for random-access transmission may be given by higher layers, e.g., Open Systems Interconnection ("OSI") layers 3-7.

The structure of an exemplary random-access transmission is specified in Release 7 of the Technical Specification of a Group Radio Access Network issued in March 2006 by the 3rd Generation Partnership Project, TS 25.213 Section 4.3.3.1. Per this specification, the random-access transmission includes a RACH preamble transmission followed by a message part transmission. Each RACH preamble transmission is 4096 chips long and typically consists of 256 repetitions of a 16-bit Walsh-Hadamard preamble sequence signature. The mobile station randomly selects the Walsh-Hadamard preamble sequence signature from among a predetermined set of up to 16 possible Walsh-Hadamard preamble sequence signatures, according to a predefined broadcast configuration. The mobile station also randomly selects one of the preamble scrambling codes selected by the base station and spreads the 256 repetitions of the 16-bit Walsh-Hadamard preamble sequence signature using the selected preamble scrambling code. Finally, the mobile station modulates the transmission by a complex phasor signal $$e^{j(\frac{\pi}{2}n+\frac{\pi}{4})},$$

where n ranges from 0 to 4095 and where n=0 corresponds to the chip transmitted first in time.

A RACH preamble transmission may be repeated with power-ramping, e.g., increasing the preamble transmission power by a power ramping step size as signaled by the base station. When the receiver in the base station successfully receives and acquires the preamble transmission from a mobile station, the base station transmits a downlink Acquisition Indicator Channel (AICH) signal to the mobile station. After successful reception of the AICH signal, the mobile station may transmit a connection request within the message part of the RACH channel. In response, the base station sends a connection setup message to the mobile station, thus completing the connection process.

FIG. 1 is a block diagram illustrating a receiver 100 of a base station in a mobile communication system. Referring to FIG. 1, the receiver 100 includes an antenna 102, a radio frequency (RF) analog/baseband digital converter 104, a preamble searcher 106, a RAKE receiver 108, and a processor 110. The RF analog/baseband digital converter 104 converts a radio frequency analog signal received through antenna 102 to a baseband digital signal. The converted baseband digital signal is inputted to both the preamble searcher 106 and the RAKE receiver 108.

Preamble searcher 106 performs RACH preamble detection by correlating the received signal with each of the scrambling codes selected by the base station and each of the sixteen possible preamble signature sequences. The correlation may be performed using either coherent integration alone or a combination of coherent and noncoherent integration, in accordance with techniques known in the art. Because the base station does not know exactly when the mobile station will begin transmitting its reamble transmission, the base station performs its correlations for a plurality of timing offsets within an offset time period, referred to as the search window. The search window is typically aligned in time with the base station downlink frame timing.

Assuming that the mobile station immediately responds by transmitting the preamble transmission to the base station, the time at which the base station receives the preamble transmission will be determined by the round-trip time delay resulting from signal propagation from the base station to the mobile station and back. The offset time period is typically selected to correspond to the largest possible round-trip delay between the base station and the mobile station, based on the maximum cell radius of the W-CDMA system. In an exemplary system, the maximum offset time period is 512 chip periods. Further, for the purpose of searching for a preamble signal, the resolution of the time search may be coarse, e.g., a half-chip resolution. As a result, for a 512-chip period window, 1024 half-chip timing offsets are searched.

A preamble is detected for a given scrambling code, preamble signature sequence, and timing offset, when the correlation energy exceeds a certain predefined threshold. Finally, the preamble searcher 106 transmits information about the detected preamble signals to the processor 110 and RAKE receiver 108, which proceeds to demodulate the message part transmission, which follows the preamble transmission.

Figure 2:
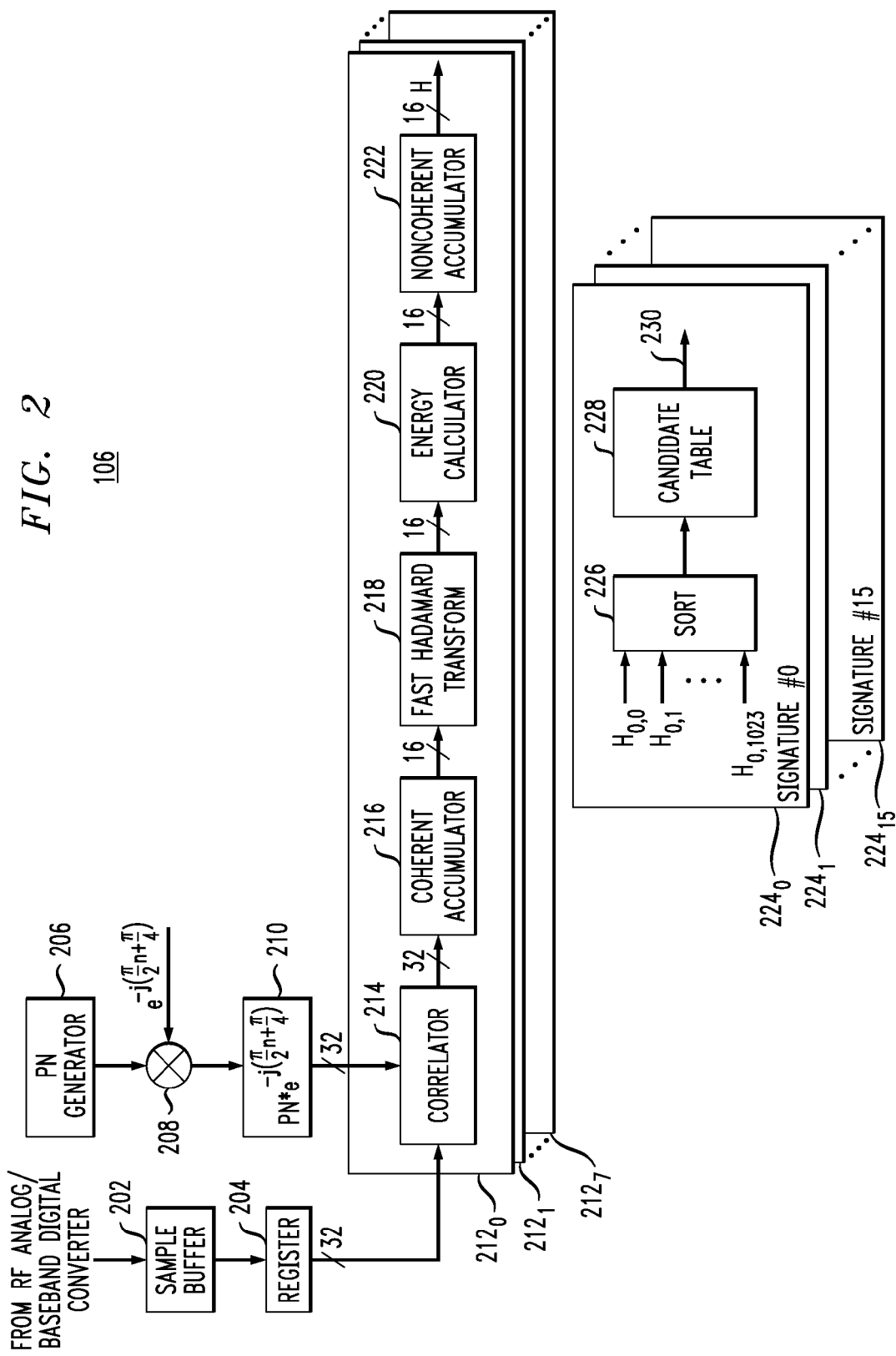
FIG. 2 is a simplified block diagram illustrating the preamble searcher shown in FIG. 1.

FIG. 2 is a simplified block diagram showing an exemplary embodiment of preamble searcher 106 of FIG. 1, as described by Jung et al. As shown in FIG. 2, preamble searcher 106 includes a sample buffer 202, a storage register 204, at least one preamble scrambling code generator 206, a multiplier unit 208, at least one phasor-multiplied code buffer 210, eight hypothesis engines $212_0$-$212_7$, and sixteen sort engines $224_0$-$224_{15}$. In the embodiment shown in FIG. 2, eight hypothesis engines are used, in order to satisfy the computational requirements of preamble searcher 106. Sample buffer 202 and code buffer 210 are each preferably implemented via a double buffer that simultaneously allows a read operation from one portion and a write operation to another portion of the double buffer. Each hypothesis engine $212_i$ includes a correlator unit 214, a coherent accumulator 216, a Fast Hadamard Transformer ("FHT") 218, an energy calculator 220, and a noncoherent accumulator 222. Each sort engine $224_i$ includes a sort unit 226 and a candidate table 228.

A complex-valued input signal (having in-phase and quadrature components) is received through antenna 102 and RF analog/baseband digital converter 104 (both shown on FIG. 1) and sampled. The resulting input signal samples, which are complex fixed-point signed values, are passed to sample buffer 202, storage register 204, and then correlator unit 214. As described above, preamble searcher 106 performs RACH preamble detection by correlating the received signal with each of the scrambling codes selected by the base station (typically four) and each of the sixteen possible preamble signature sequences, for each timing offset. Assuming that four scrambling codes are selected by the base station, there are 64 possible combinations of preamble transmissions for each timing offset. Assuming a search window having 1024 half-chip timing offsets, there are thus 65,536 possible hypotheses to be tested.

For a given hypothesis, preamble scrambling code generator 206 produces a preamble scrambling code $S_{r\text{-}pre,n}$, selected from among the preamble scrambling codes selected by the base station for the RACH preamble procedure. The preamble scrambling code $S_{r\text{-}pre,n}$ is multiplied at multiplier unit 208 by the complex phasor signal $$e^{-j\left(\frac{\pi}{2}n+\frac{\pi}{4}\right)},$$

where n ranges from 0 to 4095 and where n=0 corresponds to the chip transmitted first in time. The complex phasor signal is the inverse of the phasor added by the mobile station. The result of the multiplication is a complex-valued, phasor-multiplied code sequence $$PN * e^{-j\left(\frac{\pi}{2}n+\frac{\pi}{4}\right)}$$

that is stored in code buffer 210.

The complex-valued phasor-multiplied code sequence $$PN * e^{-j\left(\frac{\pi}{2}n+\frac{\pi}{4}\right)}$$

then passes from the code buffer 210 to all eight hypothesis engines $212_i$. Each hypothesis engine $212_i$ uses a well-known correlation technique employing both coherent and noncoherent accumulation, as well as Hadamard sequence subcorrelation via the FHT 218, to correlate the complex-valued phasor-multiplied code sequence $$PN * e^{-j\left(\frac{\pi}{2}n+\frac{\pi}{4}\right)}$$

with the complex-valued input sample from register 204. Each hypothesis engine $212_i$ operates on a different timing offset $T_i$ of the input sample. Further, each hypothesis engine $212_i$ operates on a chunk-by-chunk basis. More specifically, each correlator unit 214 operates on one 32-chip chunk of the complex-valued phasor-multiplied code sequence $$PN * e^{-j\left(\frac{\pi}{2}n+\frac{\pi}{4}\right)}$$

and on a corresponding 32-chip chunk of the complex-valued input sample from the register 204 at a time. Each chunk of the phasor-multiplied code sequence $$PN * e^{-j\left(\frac{\pi}{2}n+\frac{\pi}{4}\right)}$$

is correlated with a corresponding chunk of the input sample from the register 204. Coherent accumulator 216 accumulates the correlation results for a predetermined number $N_c$ of consecutive chunks and passes the accumulated results to the FHT 218.

FHT 218 in turn outputs a vector subcorrelation signal indicating how well the accumulated signal corresponds to each of the 16 possible preamble signature sequences. The Fast Hadamard Transform is well-known in the art and is discussed in references such as "Fast Transforms: Algorithms, Analysis, Applications," pages 301-329, by D. Elliot and K. Rao, Academic Press, Orlando, Fla., 1982, the teachings of which are incorporated herein by reference in their entirety. An exemplary butterfly diagram for an FHT is provided in the paper by Eun-Sun Jung et al. The FHT 218 produces a set of 16 subcorrelation signals, one for each possible preamble signature sequence.

Next, the 16 transformed signals output by the FHT 218 are passed to energy calculator 220, which computes the 16 signal energies of the FHT output signals in accordance with known techniques and passes the results to the noncoherent accumulator 222. Noncoherent accumulator 222 accumulates the 16 signal energies over the entire phasor-multiplied code sequence $$PN * e^{-j\left(\frac{\pi}{2}n+\frac{\pi}{4}\right)}$$

and produces a set of 16 energy hypotheses H (one for each of the 16 Hadamard signature sequences). The set of 16 energy hypotheses H is then passed to sort engines $224_0$-$224_{15}$. The hypotheses for each signature are sorted at each sort unit 226 on sort engines $224_0$-$224_{15}$ (one for each signature), and a corresponding candidate table 228 of hypothesis energies, arranged by energy levels with the highest energy levels corresponding to the most likely candidates, is produced.

The process described above is repeated for each of the possible phasor-multiplied code sequences $$PN * e^{-j\left(\frac{\pi}{2}n+\frac{\pi}{4}\right)},$$

and for each possible timing offset within the timing window to be searched. In order to accelerate the searching process, hypothesis engines $212_0$-$212_7$ operate in parallel, each working on a different hypothesis. When all of the possible hypotheses have been tested and sorted, the most probable signal hypotheses are provided to RAKE receiver 108 on FIG. 1 via connection 230.

Figure 3:
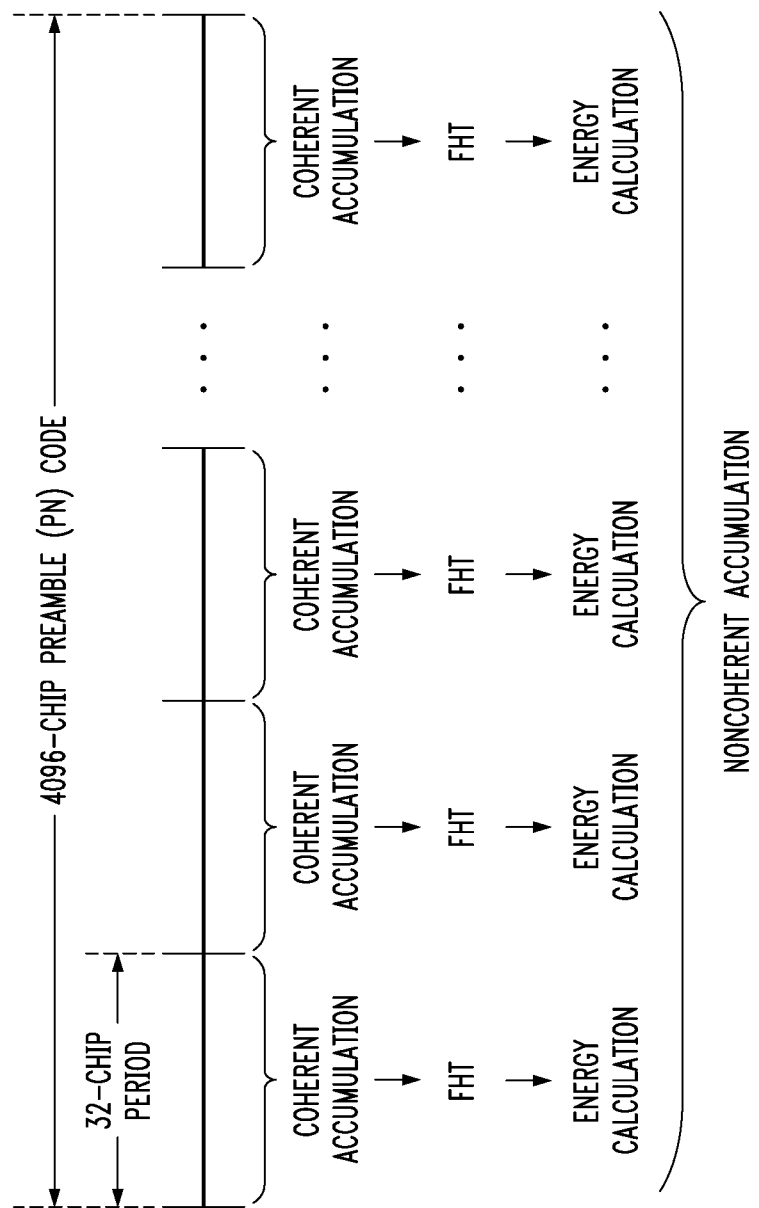
FIG. 3 is a diagram illustrating the timing of energy calculation for a received signal by the preamble searcher of FIG. 2.

FIG. 3 is a diagram that illustrates an example of coherent calculation for one timing offset over 128 different 32-chip periods of a 4096-chip preamble transmission and the corresponding non-coherent calculation for the 128 32-chip periods. In the embodiment represented in FIG. 3, the chunk length is 32 chip periods and the coherent correlation length is also 32 chip periods. As represented in FIG. 3, 32-chip chunks of the sampled input signal are coherently correlated with 32-chip chunks of the phasor-multiplied code sequence $$PN * e^{-j\left(\frac{\pi}{2}n+\frac{\pi}{4}\right)}.$$

The resulting correlated signals are coherently accumulated and subjected to a Fast Hadamard Transform. The FHT produces 16 subcorrelation signals (one for each possible Hadamard sequence signature) for each one of the 128 32-chip samples. Next, energy values of each of the 128 transformed signals are obtained for each of the 16 subcorrelation signals and accumulated noncoherently over all of the 128 32-chip periods. After a sufficient quantity of 32-chip samples have been processed to achieve a reasonable probability of preamble acquisition (e.g., based on the signal-to-noise ratio of the received signal), the 16 results from the noncoherent accumulation represent the accumulated hypothesis energies for the 16 possible Hadamard sequence signatures.

Figure 4:
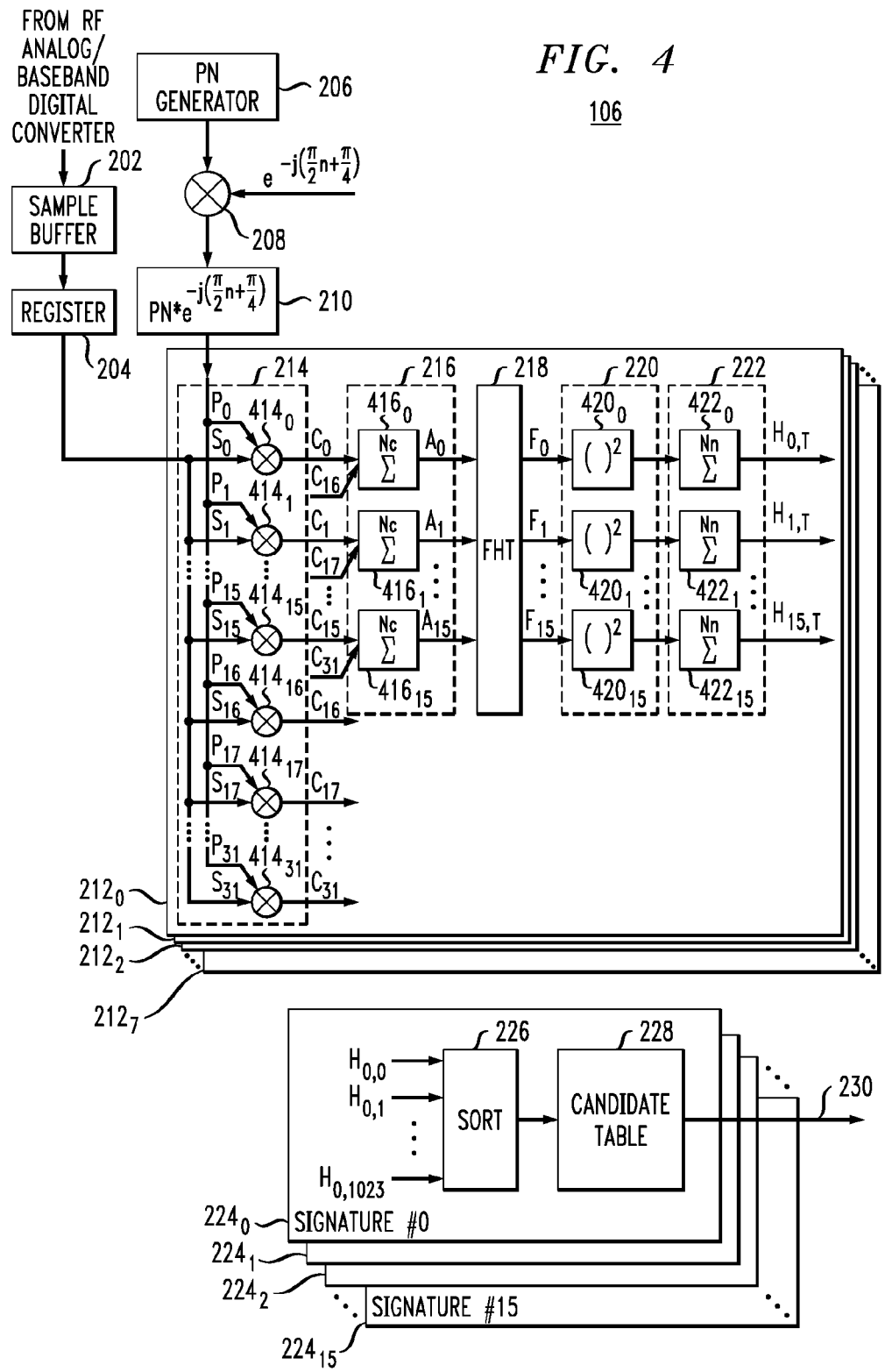
FIG. 4 is a more detailed block diagram of the preamble searcher shown in FIG. 2.

FIG. 4 is a block diagram providing a more-detailed view of the preamble searcher 106 depicted in FIG. 2, and especially illustrating the parallel nature of the correlation, coherent accumulation, energy calculation, and noncoherent accumulation processes within each hypothesis engine. It may be seen from FIG. 4 that correlator unit 214 comprises 32 complex-by-complex subcorrelators $414_0$-$414_{31}$. Each subcorrelator $414_i$ operates on one chip $S_i$ of a complex-valued 32-chip chunk of the input signal and one chip $P_i$ of the complex-valued phasor-multiplied code sequence $$PN * e^{-j\left(\frac{\pi}{2}n+\frac{\pi}{4}\right)}$$

and produces a corresponding complex correlation output $C_i$.

Correlation outputs $C_0$-$C_{15}$ are passed to coherent accumulators $416_0$-$416_{15}$, respectively. Because the phasor-multiplied code sequence $$PN * e^{-j\left(\frac{\pi}{2}n+\frac{\pi}{4}\right)}$$

repeats after 16 chips, correlation outputs $C_{16}$-$C_{31}$ are also passed to coherent accumulators $416_0$-$416_{15}$, respectively, for coherent accumulation. The coherently accumulated results $A_0$-$A_{15}$ provide 16 input signals to the FHT 218, which produces output signals $F_0$-$F_{15}$ (one for each Hadamard signature sequence). Energy-calculating elements $420_0$-$420_{15}$ provide energy calculation by squaring the FHT output signals, and the resulting energies are accumulated by noncoherent accumulators $422_0$-$422_{15}$ to produce hypothesis energies $H_{0,T}$ through $H_{15,T}$, where the first subscript indicates the signature and the second subscript indicates the timing offset $T_i$ of each hypothesis engine $212_i$.

The process is implemented in parallel for eight different timing offsets via hypothesis engines $212_0$-$212_7$. After the 1024 timing offsets have been searched, 1024 timing offset hypotheses $H_{i,0}$-$H_{i,1023}$ for each of the 16 possible Hadamard sequence signatures will have been produced and input to a corresponding sort unit 226, for a given preamble scrambling code.

In total, the entire process above is performed four times, one for each of the four preamble scrambling codes selected by the base station in this example. After all possible timing offsets and preamble scrambling codes have been searched, a candidate table 228 is produced and the most probable hypotheses are provided to RAKE receiver 108 of FIG. 1 via connection 230.

The embodiment depicted in FIG. 2 and FIG. 4, however, has a significant disadvantage, in that it requires extensive processing resources. The multiplier unit 208 must perform a complex-valued multiplication in order to multiply the real-valued preamble scrambling code $S_{r\text{-}pre,n}$ by the complex phasor signal $$e^{-j\left(\frac{\pi}{2}n+\frac{\pi}{4}\right)}.$$

Moreover, subcorrelators $414_0$-$414_{31}$ must be capable of multiplying the complex values of the phasor-multiplied preamble code sequence $$PN * e^{-j\left(\frac{\pi}{2}n+\frac{\pi}{4}\right)}$$

with the complex-valued input samples in register 204, which have both in-phase and quadrature components. These complex-by-complex multiplications are extremely resource intensive and expensive to design and manufacture.

Figure 5:
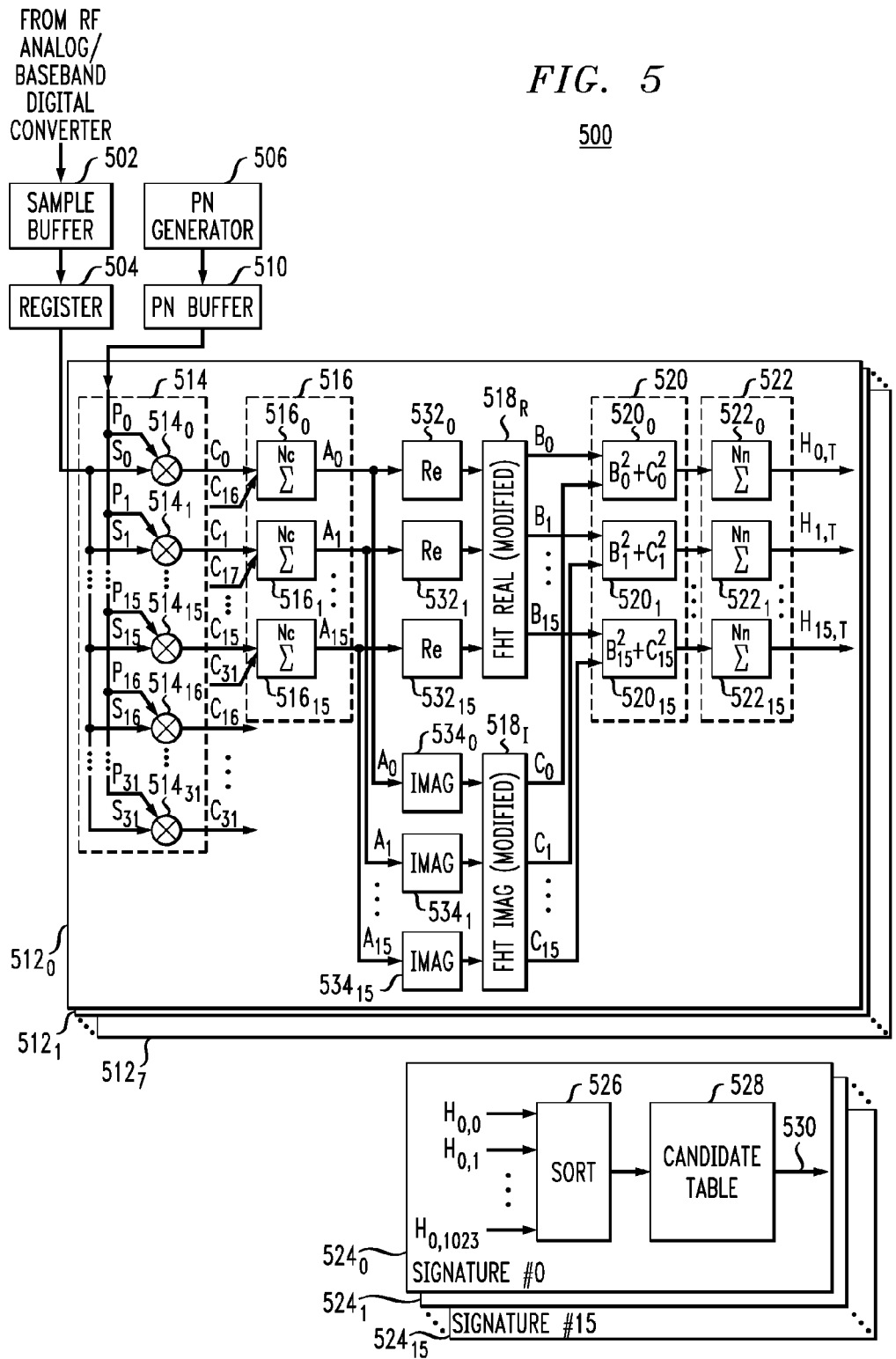
FIG. 5 is a block diagram illustrating a preamble searcher in accordance with one embodiment of the present invention.

FIG. 5 depicts an exemplary embodiment of a preamble searcher 500 in accordance with the invention. As in the preamble searcher 106 described above, the preamble length in the embodiment shown in FIG. 5 is assumed to be 4096 chips in accordance with the 3GPP Release 7.0 standard, and the preamble is assumed to consist of 256 repetitions of a signature having a length of 16 chips.

Like the preamble searcher 106 described above, the preamble searcher 500 in FIG. 5 includes a sample buffer 502, a storage register 504, a preamble scrambling code generator 506, a code buffer 510, eight hypothesis engines 512, and sixteen sort engines 524. It should be understood, however, that the quantity of hypothesis engines may be varied according to the computational requirements of preamble searcher 500. Sample buffer 502 and code buffer 510 are each preferably implemented via a double buffer that simultaneously allows a read operation from one portion and a write operation to another portion. Each hypothesis engine 512 includes a correlator unit 514, a coherent accumulator 516, an energy calculator 520, and a noncoherent accumulator 522. Further, each sort engine 524 includes a sort unit 526 and a candidate table 528.

In preamble searcher 500, however, in distinction to the preamble searcher 106 described above, each hypothesis engine 512 preferably includes first and second phasor-rotated FHTs $518_R$, $518_I$, which are fast Hadamard transformers that have been modified to incorporate phasor rotation within the transforms. The first phasor-rotated FHT $518_R$ operates on coherently accumulated real components of the correlated signal, and the second phasor-rotated FHT $518_I$ operates on coherently accumulated imaginary components of the correlated signal.

Preamble scrambling code generator 506 in the embodiment shown in FIG. 5 produces a real-valued preamble scrambling code $S_{r\text{-}pre,n}$. In the embodiment shown in FIG. 5, it is not necessary to multiply the real-valued preamble scrambling code $S_{r\text{-}pre,n}$ by the complex phasor signal $$e^{-j\left(\frac{\pi}{2}n+\frac{\pi}{4}\right)},$$

because phasor demodulation is performed within the phasor-rotated Fast Hadamard Transformers $518_R$, $518_I$. The preamble scrambling code generator 506 passes the real-valued preamble scrambling code $S_{r\text{-}pre,n}$ to code buffer 510, which in turn passes it in a chunk-by-chunk manner to hypothesis engine 512.

Hypothesis engine 512 correlates the real-valued preamble scrambling code $S_{r\text{-}pre,n}$ with the complex-valued input sample (i.e., the in-phase and quadrature components) from the register 504. In particular, correlator unit 514 comprises 32 subcorrelators $514_0$-$514_{31}$. Each subcorrelator 514, operates on one chip $S_i$ of a 32-chip chunk of the input signal and on one chip $P_i$ of the real-valued preamble scrambling code $S_{r\text{-}pre,n}$ and produces a corresponding correlation output $C_i$. Advantageously, this operation is a correlation of a real value with a complex value, which may be performed faster and/or with less complexity than a complex-by-complex correlation.

Moreover, because each chip $S_{r\text{-}pre,n,i}$ of the preamble scrambling code $S_{r\text{-}pre,n}$ has a value of positive one or negative one, each subcorrelator $514_i$ may be implemented as an inexpensive conditional sign alteration unit configured to change the signs of the real and imaginary components of the complex input signal sample $S_i$ if the corresponding chip $S_{r\text{-}pre,n,i}$ of the real-valued preamble scrambling code $S_{r\text{-}pre,n}$ is negative. In practice, pursuant to the 3GPP Release 7.0 standard, a chip $S_{r\text{-}pre,n,i}$ of the preamble scrambling code $S_{r\text{-}pre,n}$ having a positive value is represented as a binary value $P_i=0$, and a chip $S_{r\text{-}pre,n,i}$ of the preamble scrambling code $S_{r\text{-}pre,n}$ having a negative value is represented as a binary value $P_i=1$. As a result, conditional sign alteration may be accomplished, e.g., by performing a 2's complement operation on the complex input signal sample $S_i$ if chip $P_i$ has value "1". If chip $P_i$ has value "0", then input signal sample $S_i$ passes through the conditional signal sign alteration unit without sign alteration.

In a further embodiment, correlation unit 514 and coherent accumulator 516 may be implemented as a complex 2's complement adder/subtractor unit (not shown), configured to receive input signal S and binary-valued preamble scrambling code P and to produce output signal A. The complex 2's complement add/subtractor unit may include sixteen 2's complement adder/subtractor elements to operate on the real components of input signal S and sixteen 2's complement adder/subtractor elements to operate on the imaginary components of input signal S. Each 2's complement adder/subtractor element may include a control signal input that controls whether the corresponding input signal sample $S_i$ is added to, or subtracted from, the accumulated total. In this embodiment, the control signal input for each 2's complement adder/subtractor element may be connected to receive a corresponding chip $P_i$ of the binary-valued preamble scrambling code. If chip $P_i$ has value "0", the adder/subtractor element adds the corresponding input signal sample $S_i$ to the accumulated total. Conversely, if chip $P_i$ has value "1", the adder/subtractor element subtracts the input signal sample $S_i$ from the accumulated total. In this embodiment, the complex 2's complement adder/subtractor unit may run twice to process input signal samples $S_0$-$S_{31}$—once to correlate and accumulate input signal samples $S_0$-$S_{15}$, and again to correlate and accumulate input signal samples $S_{16}$-$S_{31}$. Suitable 2's complement adder/subtractor elements for use in this embodiment of the invention are well-known to those of ordinary skill in the art.

Correlation outputs $C_0$-$C_{15}$ are passed to coherent accumulators $516_0$-$516_{15}$, respectively, and correlation outputs $C_{16}$-$C_{31}$ are likewise passed to coherent accumulators $516_0$-$516_{15}$, respectively.

After coherent accumulation, at blocks $532_0$-$532_{15}$, the real components of the accumulated signals $A_0$-$A_{15}$ are passed to the first phasor-rotated FHT $518_R$, and at blocks $534_0$-$534_{15}$, the imaginary components of the accumulated signals $A_0$-$A_{15}$ are passed to the second phasor rotated FHT $518_I$. Blocks $532_0$-$532_{15}$ and $534_0$-$534_{15}$ are symbolic and do not necessarily represent specific hardware. No additional hardware is required to implement blocks $532_0$-$532_{15}$ and $534_0$-$534_{15}$, because in practice the accumulated real components are stored in a different storage location within coherent accumulators $516_0$-$516_{15}$ from the accumulated imaginary components. Accordingly, passing the real components of the accumulated signals $A_0$-$A_{15}$ may be accomplished by reading the storage location within coherent accumulators $516_0$-$516_{15}$ in which the accumulated real components are stored. Similarly, passing the imaginary components of the accumulated signals $A_0$-$A_{15}$ may be accomplished by reading the different storage location within coherent accumulators $516_0$-$516_{15}$ in which the accumulated imaginary components are stored.

The phasor-rotated Fast Hadamard Transformer $518_R$ transforms the accumulated real components of the accumulated signals $A_0$-$A_{15}$, and the phasor-rotated Fast Hadamard Transformer $518_I$ transforms the accumulated imaginary components of the accumulated signals $A_0$-$A_{15}$. These transformations serve to remove the signature code from the preamble signal. Phasor-rotated Fast Hadamard Transformers $518_R$ and $518_I$ are preferably radix-2 FFT structures having butterfly charts as described in detail below.

After transformation, the transformed real and imaginary component signals $B_0$-$B_{15}$ and $C_0$-$C_{15}$ are passed to energy-calculating elements $520_0$-$520_{15}$. Energy-calculating elements $520_0$-$520_{15}$ preferably compute the energy of each scrambling code and time offset by squaring the transformed real and imaginary components of the correlated signals and adding the squared results. Noncoherent accumulators $522_0$-$522_{15}$ noncoherently accumulate the signal energies to produce a set of energy hypotheses $H_{0,T}$-$H_{15,T}$, where the first subscript indicates the Walsh-Hadamard signature sequence and the second subscript indicates the timing offset $T_i$ of each hypothesis engine $512_i$. The energy hypotheses generated by hypothesis engines $512_0$-$512_7$ are sorted according to a predetermined sort criterion (e.g., order of magnitude) for each signature by sort unit 526 and stored in table 528 of candidate signals. The most-probable signal hypotheses are then provided to RAKE receiver 108 on FIG. 1 via connection 530.

Figure 6:
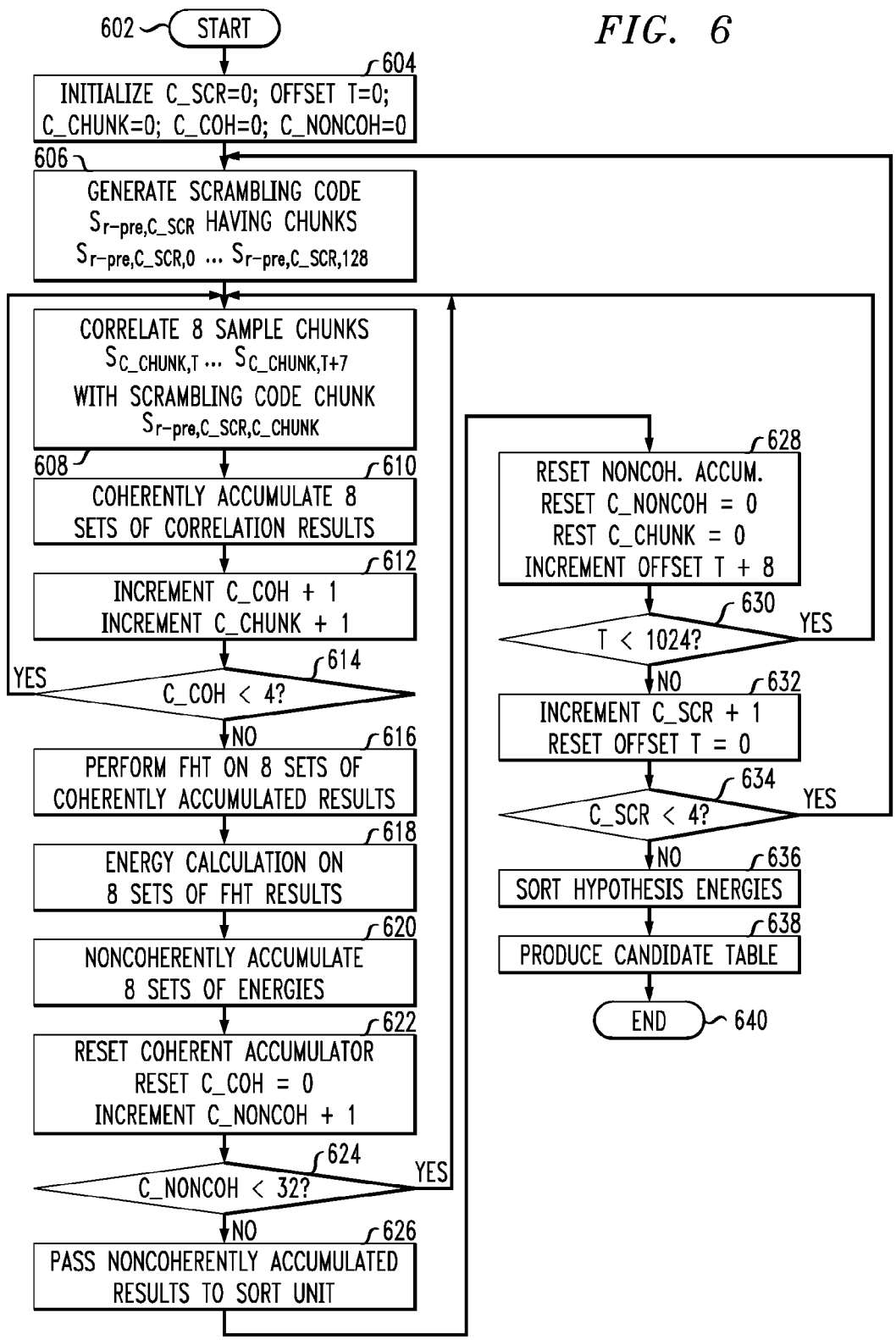
FIG. 6 is a flow diagram illustrating the operation of a possible implementation of a preamble searcher in accordance with one embodiment of the present invention.

The operation of one possible implementation of preamble searcher 500 is further illustrated in FIG. 6. In the example shown in FIG. 6, a coherent correlation length $N_c$ is selected to be 128 chips. Because correlation unit 514 handles 32 single-chip correlations at once, in order to achieve a correlation length $N_c$ of 128 chips, correlation unit 514 runs four times, and the coherent accumulator 520 accumulates the correlation results four times, before the coherent accumulator 520 passes the real and imaginary components of the coherently accumulated results to the phasor-rotated FHTs $518_R$ and $518_I$. Further, noncoherent accumulation may occur up to 32 times (the preamble length of 4096 divided by the coherent correlation length Nc of 128 chips in this example). In practice, the actual quantity N_NONCOH of noncoherent accumulation cycles may be less than 32 and may be selected in accordance with techniques known to those of ordinary skill in the art to provide a reasonable probability of preamble acquisition (e.g., based on the signal-to-noise ratio of the received signal).

The operation of the preamble searcher 500 begins at step 602 in FIG. 6. In step 604, the various counters that are needed to manage the searching process are initialized. In particular, scrambling code counter C_SCR, timing offset T, chunk counter C_CHUNK, coherent accumulation counter C_COH, and noncoherent accumulation counter C_NON-COH are set to zero. In step 606, a preamble scrambling code $S_{r\text{-}pre,C\_SCR}$ is generated. Scrambling code $S_{r\text{-}pre,C\_SCR}$ is a real-valued binary number having a length of 4096 chips, comprising 128 chunks $S_{r\text{-}pre,C\_SCR,0} \ldots S_{r\text{-}pre,C\_SCR,128}$, each chunk being 32 chips in length.

In step 608, each correlation unit 514 of the eight hypothesis engines 512 correlates one 32-chip chunk $S_{C\_CHUNK,T} \ldots S_{C\_CHUNK,T+7}$ for eight different timing offsets T . . . T+7 of the complex-valued input signal with the corresponding real-valued 32-chip preamble scrambling code chunk $S_{r\text{-}pre,C\_SCR,C\_CHUNK}$. In step 610, coherent accumulator 516 on each hypothesis engine 512$_i$ coherently accumulates the correlation results C for the correlated chunks. In step 612, counters C_COH and C_CHUNK are incremented by one. In step 614, the current value of counter C_COH is compared with the number of chunks that are to be coherently accumulated, which, in the example shown in FIG. 6, is four. If counter C_COH is less than four, operation returns to step 608, and another 8 sample chunks $S_{C\_CHUNK,T} \ldots S_{C\_CHUNK,T+7}$ for the eight different timing offsets T . . . T+7 of the input sample are correlated with the corresponding 32-chip preamble scrambling code chunk $S_{r\text{-}pre,C\_SCR,C\_CHUNK}$. After four iterations, coherent accumulation is complete, and operation continues at step 616.

At step 616, each hypothesis engine 512, performs real and imaginary phasor-rotated FHTs on the real and imaginary components of the coherently accumulated results A. At step 618, each hypothesis engine 512, calculates the energy of each of the sixteen phasor-rotated FHT outputs B and C, and at step 620, each hypothesis engine 512$_i$ noncoherently accumulates the energies to produce sixteen hypotheses $H_{0,T} \ldots H_{15,T}$ (where the first subscript indicates the Hadamard signature sequence and the second subscript indicates the timing offset $T_i$ of each hypothesis engine 512$_i$). At step 622, the coherent accumulator on each hypothesis engine 512$_i$ is reset to zero, and the coherent calculation counter C_COH is also reset to zero.

At step 624, the current value of the noncoherent accumulation counter C_NONCOH is compared with the number N_NONCOH of noncoherent accumulation cycles that are to be performed (32 cycles in the example in FIG. 6). If fewer than N_NONCOH cycles have been performed, then operation returns to step 608, and another noncoherent accumulation cycle is carried out. This process continues until a sufficient number of chunks of the 4096-chip preamble code have been correlated with the corresponding chunks of the eight different input samples $S_T \ldots S_{T+7}$ having different timing offsets to provide a reasonable expectation of successful detection of the preamble transmission. After N_NONCOH noncoherent accumulation cycles (32 in the example in FIG. 6) have been completed, operation continues at step 626.

At step 626, the noncoherently accumulated results from noncoherent accumulator 520 in each hypothesis engine 512 are passed to sort engines 524. These results are the vector hypotheses H (including sixteen energies, one for each possible Hadamard signature sequence), for each timing offset searched (T . . . T+7) and for the current preamble scrambling code $S_{r\text{-}pre,C\_SCR}$. In particular, the hypotheses $H_{0,T} \ldots H_{0,T+7}$ corresponding to the first Hadamard signature sequence are passed to sort engine 524$_0$, the hypotheses $H_{1,T} \ldots H_{1,T+7}$ corresponding to the second Hadamard signature sequence are passed to sort engine 524$_1$, and so on.

At step 628, the noncoherent accumulator and counters C_NONCOH and C_CHUNK are reset to zero, and the timing offset T is incremented by eight. In step 630, the current timing offset T is compared to the number of half-chip timing offsets to be searched, which is 1024 in the example in FIG. 6. If fewer than 1024 timing offsets have been searched, operation returns to 608, and another complete cycle of correlation, coherent accumulation, phasor-rotated FHT, energy calculation, and noncoherent accumulation is performed for another set of eight timing offsets. After all 1024 timing offsets have been searched, using the current scrambling code $S_{r\text{-}pre,C\_SCR}$, operation continues at step 632.

At step 632, the scrambling code counter C_SCR is incremented by 1, and the timing offset T is reset to zero. At step 634, the current scrambling code counter C_SCR is compared with four. If further scrambling codes remain to be searched, operation returns to step 606, and a new preamble scrambling code $S_{r\text{-}pre,C\_SCR}$ is generated. After all four scrambling codes selected by the base station have been searched, operation continues at step 636.

At step 636, the 1024 hypothesis energies for each of the sixteen possible Hadamard signature sequences and for each of the selected preamble codes are sorted. This step may also include comparing the hypothesis energies to a predetermined threshold in accordance with techniques that are well-known to those of ordinary skill in the art. Finally, in step 638, a candidate table is produced for each of the sixteen possible Hadamard signature sequences, and operation ends at step 640.

Phasor-rotated Fast Hadamard Transformations suitable for use in transformers 518$_R$ and 518$_I$ will now be mathematically described and derived.

Algorithm Description
Hadamard Sequences Definition
Hadamard sequences generally may be defined as rows of the next recursively constructed matrix according to the following equation:

$$H_{2^n} = \begin{bmatrix} H_{2^{(n-1)}} & H_{2^{(n-1)}} \\ H_{2^{(n-1)}} & -H_{2^{(n-1)}} \end{bmatrix}, \text{ for } n \geq 2 \qquad \text{Equ. 1}$$

where, for n=2, the first element is given by $$H_2 = \begin{bmatrix} 1 & 1 \\ 1 & -1 \end{bmatrix}.$$

Hadamard Sequence Multiplication by a Phasor
The multiplication of a 16-bit Hadamard sequence $P_k(n)$ by the phasor $$e^{-j\left(\frac{\pi}{2}n+\frac{\pi}{4}\right)}$$

may be expressed as a transformation of a real Hadamard sequence into a complex Hadamard sequence, as follows:

$$P_k(n) * e^{-j\left(\frac{\pi}{2}n+\frac{\pi}{4}\right)} = P'_k(n) = P_s^{Re}(n) + jP_m^{Im}(n) \qquad \text{Equ. 2}$$

where the real and imaginary parts of $P_k(n)$ are also in turn Hadamard sequences but have different indexes s, m and are taken from other matrixes that are called $H_{16}^R$ and $H_{16}^I$, respectively.

Phasor Sequence Calculation:
When $n=0$, $\exp(\pi/4)=1/\sqrt{2}(1+1j) \Rightarrow \text{Real}(n=0) =1$,
  Imag(n=0)=1, Imag($n=0$)=1

When $n=1$, $\exp(3\pi/4)=1/\sqrt{2}(-1+1j) \Rightarrow \text{Real}(n=1)=-1$,
  Imag($n=1$)=1

When $n=2$, $\exp(5\pi/4)=1/\sqrt{2}(-1-1j) \Rightarrow \text{Real}(n=2)=-1$, $\text{Imag}(n=2)=-1$ When $n=3$, $\exp(7\pi/4)=1/\sqrt{2}(-1-1j) \Rightarrow \text{Real}(n=3)=1$, $\text{Imag}(n=3)=-1$ Because the phasor value belongs to a QPSK constellation, the sequence repeats itself, starting from n=4.

It has been experimentally shown and may be analytically proven that Hadamard properties are preserved as the result of phasor multiplication. Mathematically, this means that for all possible values of k (k ∈ [0, ... ,15]), $P_s^{Re}(n)$ and $P_m^{Im}(n)$ are also Hadamard sequences (s ∈ [0,15], m ∈ [0,15]).

It may further be shown that Hadamard properties are unique. In other words, no transformations exist that will cause two different real Hadamard sequences to be transformed into the same complex sequence. Moreover, for all $P'_k(n)$ sequences, the indexes of real and imaginary parts of complex Hadamard sequences do not repeat. Thus, assume that $P_{k_1}(n)$ and $P_{k_2}(n)$ are two real Hadamard sequences that are transformed into two complex ones $P_{k_1}'(n)=P_{s_1}^{Re}(n)+jP_{m_1}^{Im}(n)$, $P_{k_2}'(n)=P_{s_2}^{Re}(n)+jP_{m_2}^{Im}(n)$. Then, for $\forall k_1, k_2$, where $k_1, k_2 \in [0,15]$ and $k_1 \neq k_2$, it follows that $s_1 \neq s_2$ and $m_1 \neq m_2$ where $s_1, s_2, m_1, m_2 \in [0,15]$.

EXAMPLE NO. 1

A $P_0(n)$ Hadamard sequence (the first row of the matrix given in Equation 1 above) comprising 16 ones may be multiplied in a chip-by-chip manner by a phasor value (n=0 ... 15).

The real and imaginary multiplications may be written as follows:

For Real: [1 1 1 1 1 1 1 1 1 1 1 1 1 1 1 1]*

[1 −1 −1 1 1 −1 −1 1 1 −1 −1 1 1 −1 −1 1 1] =

[1 −1 −1 1 1 −1 −1 1 1 −1 −1 1 1 −1 −1 1 1] =

$P_s^{Re}(n) = P_3(n)$

For Imaginary: [1 1 1 1 1 1 1 1 1 1 1 1 1 1 1 1]*

[1 1 −1 −1 1 1 −1 −1 1 1 −1 −1 1 1 −1 −1 1] =

[1 1 −1 −1 1 1 −1 −1 1 1 −1 −1 1 1 −1 −1 1] =

$P_m^{Im}(n) = P_2(n)$

EXAMPLE NO. 2

The $P_{13}(n)$ Hadamard sequence may be multiplied in a chip-by-chip manner by a phasor value (n=0 ... 15):

The real and imaginary multiplications may be written as follows:

For Real: [1 −1 1 −1 −1 1 −1 1 −1 1 −1 1 1 −1 1 −1]*

[1 −1 −1 1 1 −1 −1 1 1 −1 −1 1 1 −1 −1 1 1] =

[1 1 −1 −1 −1 −1 1 1 −1 −1 1 1 1 1 −1 −1] = $P_s^{Re}(n) = P_{14}(n)$

For Imaginary: [1 −1 1 −1 −1 1 −1 1 −1 1 1 −1 1 1 −1 1 −1]*

[1 1 −1 −1 1 1 −1 −1 1 1 −1 −1 1 1 −1 −1 1] =

[1 −1 −1 1 1 −1 −1 1 1 −1 −1 1 1 −1 −1 1 1] = $P_m^{Im}(n) = P_{15}(n)$

Recursive Properties of Phasor-Rotated Hadamard Sequence

One may notice the following recursive properties for the real $H_{16}^R$ part of $P_k'(n)$.

$$H_{16}^R = \begin{bmatrix} H_8^R & H_8^R \\ H_8^R & -H_8^R \end{bmatrix}, H_8^R = \begin{bmatrix} H_4^R & H_4^R \\ H_4^R & -H_4^R \end{bmatrix}, \quad \text{Equ. 3}$$

$$H_4^R = \begin{bmatrix} H_2^R & -H_2^R \\ H_2^R & H_2^R \end{bmatrix}, H_2^R = \begin{bmatrix} 1 & -1 \\ 1 & 1 \end{bmatrix}$$

Similarly, for the imaginary $H_{16}^I$ part, it follows that $$H_{16}^I = \begin{bmatrix} H_8^I & H_8^I \\ H_8^I & -H_8^I \end{bmatrix}, H_8^R = \begin{bmatrix} H_4^I & H_4^I \\ H_4^I & -H_4^I \end{bmatrix}, \quad \text{Equ. 4}$$

$$H_4^I = \begin{bmatrix} H_2^I & -H_2^I \\ H_2^I & H_2^I \end{bmatrix}, H_2^I = \begin{bmatrix} 1 & 1 \\ 1 & -1 \end{bmatrix}$$

The existence of recursive dependency makes possible the implementation of Fast Hadamard Transforms for both the real and imaginary parts. Importantly, the standard FHT mechanism does not work here, due to the irregular form of the last two recursions. In addition, one may note that $H_2^R \neq H_2^I$, which makes FHT processing nonsymmetrical for the real and imaginary parts of the phasor-rotated Hadamard sequences.

Phasor-Rotated FHT Derivation

The following provides the derivation of modified Hadamard transforms for the recursive equations given above.

Any orthogonal (unitary) matrix can be used to define an orthogonal (unitary) transform. Accordingly, one may define a Fast Hadamard transform of Hadamard order N as forward and inverse transform pairs:

$$\begin{cases} X = Hx \\ x = HX \end{cases} \quad \text{Equ. 5}$$

Here, $x=[x[0], x[1], \ldots, x[N-1]]^T$ and $X=[X[0], X[1], \ldots, X[N-1]]^T$ are the signal and spectrum vectors, respectively. The k-th element of the transform can also be written as:

$$X[k] = \sum_{m=0}^{N-1} h[k,m]x[m] = \sum_{m=0}^{N-1} x[m] \prod_{i=0}^{n-1} (-1)^{m_i k_i} \quad \text{Equ. 6}$$

The complexity of a standard FHT is given by $O(N^2)$. Similar to the Fast Fourier Transform ("FFT") algorithm, one may derive an FHT algorithm with complexity of $O(N \log_2 N)$. Assume that $n=4$ and $N=2^4=16$ in the following derivation. The real part of the phasor-rotated Hadamard transform will be derived first below, followed by the imaginary part.

Real-Part FHT Derivation
Stage #1:

$$\begin{bmatrix} X^R[0] \\ X^R[1] \\ \ldots \\ X^R[7] \\ \ldots \\ X^R[15] \end{bmatrix} = \begin{bmatrix} H_8^R & H_8^R \\ H_8^R & -H_8^R \end{bmatrix} \begin{bmatrix} x^R[0] \\ x^R[1] \\ \ldots \\ x^R[7] \\ \ldots \\ x^R[15] \end{bmatrix}; \quad \text{Equ. 7}$$

This equation may be separated into two parts:

$$\begin{bmatrix} X^R[0] \\ X^R[1] \\ \ldots \\ X^R[7] \end{bmatrix} = H_8^R \begin{bmatrix} x^R[0] \\ x^R[1] \\ \ldots \\ x^R[7] \end{bmatrix} + H_8^R \begin{bmatrix} x^R[8] \\ x^R[9] \\ \ldots \\ x^R[15] \end{bmatrix} = H_8^R \begin{bmatrix} x_1^R[0] \\ x_1^R[1] \\ \ldots \\ x_1^R[7] \end{bmatrix}; \quad \text{Equ. 8}$$

$x_1^R[i] = x^R[i] + x^R[i+8]$, where $(i=0,\ldots 7)$

The second half of X vector can be obtained as $$\begin{bmatrix} X^R[8] \\ X^R[9] \\ \ldots \\ X^R[15] \end{bmatrix} = H_8^R \begin{bmatrix} x^R[0] \\ x^R[1] \\ \ldots \\ x^R[7] \end{bmatrix} - H_8^R \begin{bmatrix} x^R[8] \\ x^R[9] \\ \ldots \\ x^R[15] \end{bmatrix} = H_8^R \begin{bmatrix} x_1^R[8] \\ x_1^R[9] \\ \ldots \\ x_1^R[15] \end{bmatrix}; \quad \text{Equ. 9}$$

$x_1^R[i+8] = x^R[i] - x^R[i+8]$, where $(i=0,\ldots 7)$

Thus, the FHT of size N=16 has been converted into two FHTs of size N/2=8.

Stage #2:
Continuing this process, one may write as follows:

$$\begin{bmatrix} X^R[0] \\ X^R[1] \\ \ldots \\ X^R[7] \end{bmatrix} = \begin{bmatrix} H_4^R & H_4^R \\ H_4^R & -H_4^R \end{bmatrix} \begin{bmatrix} x_1^R[0] \\ x_1^R[1] \\ \ldots \\ x_1^R[7] \end{bmatrix}; \quad \text{Equ. 10}$$

$$\begin{bmatrix} X^R[0] \\ X^R[1] \\ X^R[2] \\ X^R[3] \end{bmatrix} = H_4^R \begin{bmatrix} x_1^R[0] \\ x_1^R[1] \\ x_1^R[2] \\ x_1^R[3] \end{bmatrix} + H_4^R \begin{bmatrix} x_1^R[4] \\ x_1^R[5] \\ x_1^R[6] \\ x_1^R[7] \end{bmatrix} = H_4^R \begin{bmatrix} x_2^R[0] \\ x_2^R[1] \\ x_2^R[2] \\ x_2^R[3] \end{bmatrix}; \quad \text{Equ. 11}$$

$x_2^R[i] = x_1^R[i] + x_1^R[i+4]$, where $(i=0,\ldots 3)$ $$\begin{bmatrix} X^R[4] \\ X^R[5] \\ X^R[6] \\ X^R[7] \end{bmatrix} = H_4^R \begin{bmatrix} x^R[0] \\ x^R[1] \\ x^R[2] \\ x^R[3] \end{bmatrix} - H_4^R \begin{bmatrix} x^R[4] \\ x^R[5] \\ x^R[6] \\ x^R[7] \end{bmatrix} = H_4^R \begin{bmatrix} x_2^R[4] \\ x_2^R[5] \\ x_2^R[6] \\ x_2^R[7] \end{bmatrix}; \quad \text{Equ. 12}$$

$x_2^R[i+4] = x_1^R[i] - x_1^R[i+4]$, where $(i=0,\ldots 3)$

Thus, the FHT of size N=8 has now been converted into two FHTs of size 4.

Based on the cyclic properties of the FHT, one may further write as follows:

$x_2^R[i+8]=x_1^R[i+8]+x_1^R[i+12]$, where $(i=0,\ldots 3)$ $x_2^R[i+12]=x_1^R[i+8]-x_1^R[i+12]$, where $(i=0,\ldots 3)$ Stage #3:
Continuing this process, one may write as follows:

$$\begin{bmatrix} X^R[0] \\ X^R[1] \\ X^R[2] \\ X^R[3] \end{bmatrix} = \begin{bmatrix} H_2^R & -H_2^R \\ H_2^R & H_2^R \end{bmatrix} \begin{bmatrix} x_2^R[0] \\ x_2^R[1] \\ x_2^R[2] \\ x_2^R[3] \end{bmatrix}; \quad \text{Equ. 13}$$

$$\begin{bmatrix} X^R[0] \\ X^R[1] \end{bmatrix} = H_2^R \begin{bmatrix} x_2^R[0] \\ x_2^R[1] \end{bmatrix} - H_2^R \begin{bmatrix} x_2^R[2] \\ x_2^R[3] \end{bmatrix} = H_2^R \begin{bmatrix} x_3^R[0] \\ x_3^R[1] \end{bmatrix}; \quad \text{Equ. 14}$$

$x_3^R[i] = x_2^R[i] - x_2^R[i+2]$, where $(i=0,1)$ $$\begin{bmatrix} X^R[2] \\ X^R[3] \end{bmatrix} = H_2^R \begin{bmatrix} x_2^R[0] \\ x_2^R[1] \end{bmatrix} + H_2^R \begin{bmatrix} x_2^R[2] \\ x_2^R[3] \end{bmatrix} = H_2^R \begin{bmatrix} x_3^R[0] \\ x_3^R[1] \end{bmatrix}; \quad \text{Equ. 15}$$

$x_3^R[i+2] = x_2^R[i] + x_2^R[i+2]$, where $(i=0,1)$

Based on the cyclic properties of the FHT, one may further write as follows:

$x_3^R[i+4]=x_2^R[i+4]-x_2^R[i+6]$, where $(i=0,1)$ $x_3^R[i+6]=x_2^R[i+4]+x_2^R[i+6]$, where $(i=0,1)$ $x_3^R[i+8]=x_2^R[i+8]-x_2^R[i+10]$, where $(i=0,1)$ $x_3^R[i+10]=x_2^R[i+8]+x_2^R[i+10]$, where $(i=0,1)$ $x_3^R[i+12]=x_2^R[i+12]-x_2^R[i+14]$, where $(i=0,1)$ $x_3^R[i+14]=x_2^R[i+12]+x_2^R[i+14]$, where $(i=0,1)$ Stage #4:
And the last stage gives $X^R[0]=x_3^R[0]-x_3^R[1];$ Equ. 16

$X^R[1]=x_3^R[0]+x_3^R[1];$ Equ. 17

Based on the cyclic properties of the FHT, one may further write as follows:

$X^R[2]=x_3^R[2]-x_3^R[3];$ Equ. 18

$X^R[3]=x_3^R[2]+x_3^R[3];$ Equ. 19

$X^R[14]=x_3^R[14]-x_3^R[15];$ Equ. 20

$X^R[15]=x_3^R[14]+x_3^R[15];$ Equ. 21

Figure 7:
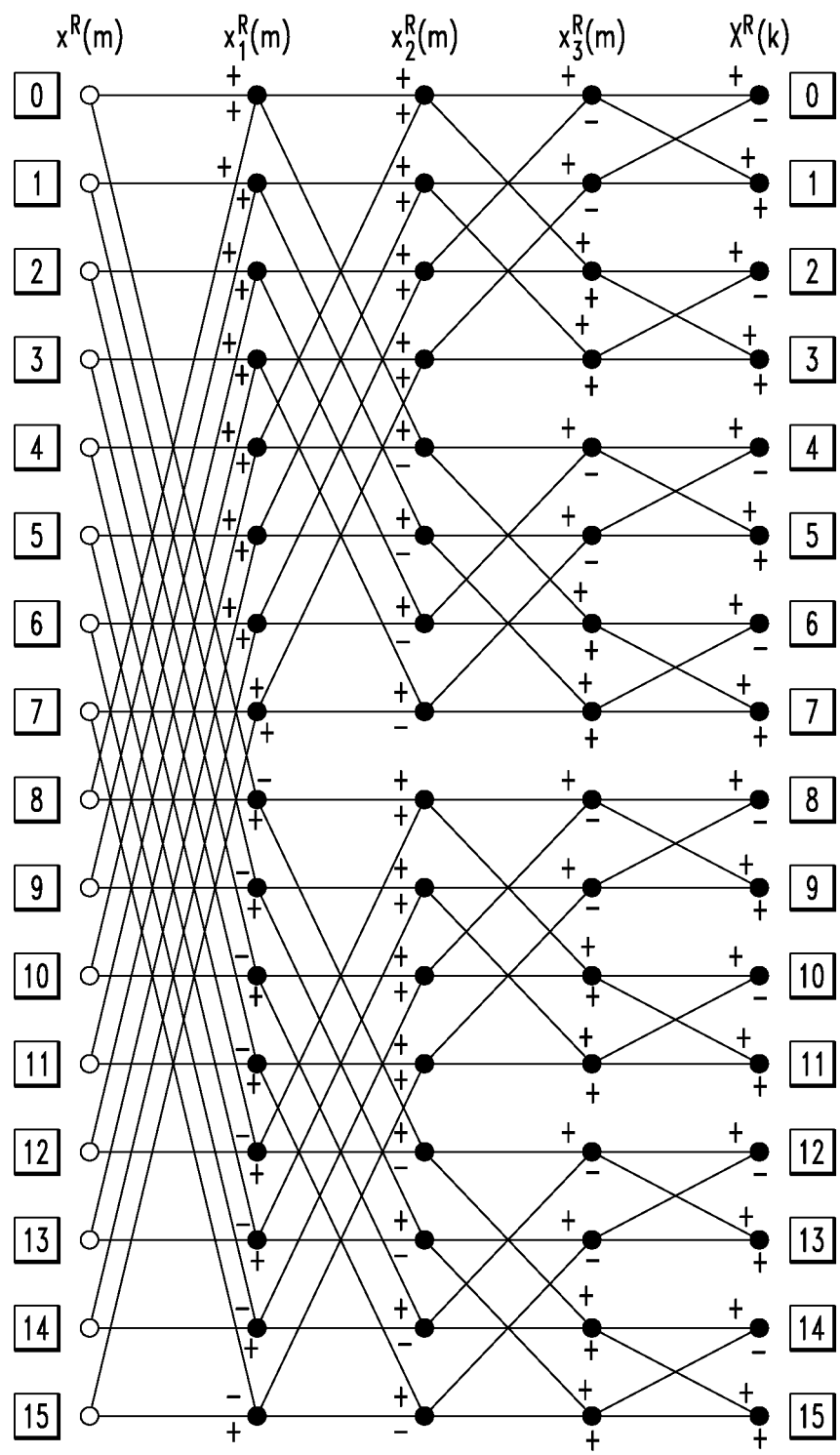
FIG. 7 is a butterfly diagram graphically depicting the stage-by-stage computations for a real-component, phasor-rotated Fast Hadamard Transform in accordance with one embodiment of the present invention.

FIG. 7 graphically depicts the stage-by-stage computations for a real-part phasor-rotated FHT as a butterfly diagram. This real-part phasor-rotated FHT serves to remove a phasor component from a received signal.

Imaginary-Part FHT Derivation

The derivation of the imaginary-component FHT is similar to the above, except that the last stage of the imaginary-component FHT is different because $H_2^R \ne H_2^I$:

$$X^I[0] = x_3^I[0] + x_3^I[1]; \quad \text{Equ. 22}$$

$$X^I[1] = x_3^I[0] - x_3^I[1]; \quad \text{Equ. 23}$$

$$X^I[14] = x_3^I[14] + x_3^I[15]; \quad \text{Equ. 24}$$

$$X^I[15] = x_3^I[14] - x_3^I[15]; \quad \text{Equ. 25}$$

Indeed, the imaginary-component FHT is the same as the real-component FHT, except that the consequent real and odd indices at the FHT output are reversed.

Figure 8:
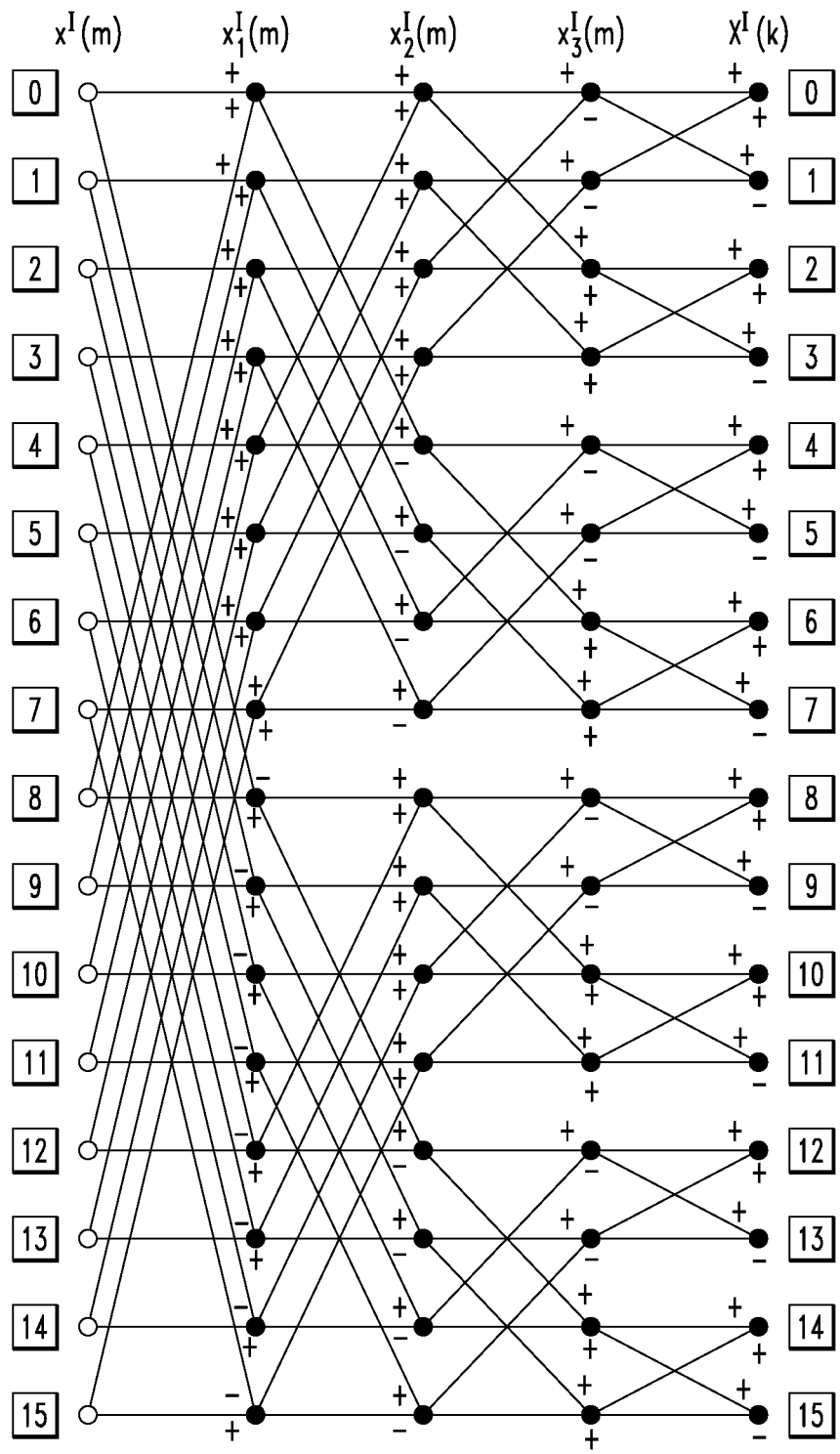
FIG. 8 is a butterfly diagram graphically depicting the stage-by-stage computations for an imaginary-component, phasor-rotated Fast Hadamard Transform in accordance with one embodiment of the present invention.

FIG. 8 graphically depicts the stage-by-stage computations for an imaginary-part phasor-rotated FHT as a butterfly diagram. This imaginary-part phasor-rotated FHT serves to remove a phasor component from a received signal.

There has thus been described a novel and innovative system and method for demodulating and searching for a preamble signal containing a complex phasor signal, wherein phasor demodulation is provided by one or more phasor-rotated fast transformers.

The present invention may be implemented as an all-digital, all-analog, or a hybrid of both analog and digital circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

It will be further understood that various changes in the details, materials, and arrangements of the parts which have been described and illustrated in order to explain the nature of this invention may be made by those skilled in the art without departing from the scope of the invention as expressed in the claims below. Thus, although the invention has been described above with respect to particular lengths and quantities of preamble code generators, sample buffers, code buffers, hypothesis engines, subcorrelation units, coherent accumulations, noncoherent accumulations, scrambling codes, and timing offsets, the invention is not so limited, and other lengths and quantities may be used. For example, in one embodiment of the invention, four preamble code generators and four corresponding code buffers may be employed, rather than one of each as depicted in FIG. 5 and described above. Further, the number of hypothesis engines may be selected for a given application according to the computational requirements of the application and as such may be greater or fewer than eight.

It should also be understood that, although phasor-rotated Fast Hadamard Transformers $518_R$ and $518_I$ are depicted in FIG. 5 as two separate transformers, they may be implemented as a single reconfigurable FHT processor that processes accumulated signals according to either a real-part phasor-rotated FHT or an imaginary-part phasor-rotated FHT scheme. In such an implementation, processor 110 in FIG. 1 may provide a control signal to the reconfigurable FHT processor to control the scheme that is to be applied at a given time. As such, the reconfigurable FHT processor may be used to transform the real components of the coherently accumulated signal and then reused to transform the imaginary components of the coherently accumulated signal.

It should further be understood that, although the present invention is described above with respect to phasor-rotated Fast Hadamard Transforms, the present invention is not limited to Hadamard Transforms. Rather, it is believed that phasor rotation may also be accomplished via other transforms as well.

It should further be understood that although the invention has been described with reference to both coherent and non-coherent accumulation, the techniques of the present invention are also applicable to a system employing only coherent accumulation. In this event, the sort engines 524 in FIG. 5 would operate on the outputs of the energy calculators 520, rather than on the outputs from the noncoherent acculators 522.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

We claim:

1. A method for signal processing in a spread-spectrum communication system, comprising:
    correlating a received signal with a spreading code to produce a correlated signal;
    coherently accumulating the correlated signal to produce a coherently accumulated signal;
    performing a first phasor-rotated signal transformation on a real component of the coherently accumulated signal;
    performing a second phasor-rotated signal transformation on an imaginary component of the coherently accumulated signal; and
    determining signal powers of the transformed real and imaginary components of the coherently accumulated signal, wherein:
        the received signal is a phasor-rotated signal; and
        the first and second phasor-rotated signal transformations perform phasor-derotation of the phasor-rotated signal.

2. The method according to claim 1, further comprising sorting the signal powers to identify at least one of (1) a timing offset of a preamble transmission within the received signal, (2) a spreading code of the preamble transmission, and (3) a signature sequence of the preamble transmission.

3. The method according to claim 1, further comprising:
    noncoherently accumulating the signal powers of the transformed real and imaginary components of the noncoherently accumulated signal; and
    sorting the noncoherently accumulated signal powers to identify at least one of (1) a timing offset of a preamble transmission within the received signal, (2) a spreading code of the preamble transmission, and (3) a signature sequence of the preamble transmission.

4. The method of claim 1, wherein:
    the received signal includes real and imaginary components; and
    correlating the received signal with the spreading code comprises altering the signs of the real and imaginary components of the received signal, based on the value of the spreading code.

5. The method according to claim 1, wherein:
    the phasor-rotated signal is a transmission signal modulated by a complex phasor signal, and the first and second phasor-rotated signal transformations are operative to demodulate the phasor-rotated signal to remove the complex phasor signal.

6. The method according to claim 5, wherein the receiver performs the first and second phasor-rotated signal transformations to demodulate the phasor-rotated signal without multiplying the phasor-rotated signal by an inverse of the complex phasor signal.

7. The method according to claim 5, wherein:
the complex phasor signal is $$e^{j\left(\frac{\pi}{2}n+\frac{\pi}{4}\right)},$$

where n=0 corresponds to the chip transmitted first in time; and
an inverse of the complex phasor signal is $$e^{-j\left(\frac{\pi}{2}n+\frac{\pi}{4}\right)}.$$

8. The method according to claim 1, wherein the first and second phasor-rotated signal transformations are operative both (i) to de-rotate the phasor-rotated signal and (ii) to remove a signature code from the phasor-rotated signal.

9. The method according to claim 1, wherein the first and second phasor-rotated signal transformations are operative simultaneously (i) to de-rotate the phasor-rotated signal and (ii) to remove the signature code from the phasor-rotated signal.

10. A signal processor, comprising:
a correlation unit configured to correlate a received signal with a spreading code to produce a correlated signal;
a coherent accumulator configured to coherently accumulate the correlated signal to produce a coherently accumulated signal;
one or more transform processors configured to (i) perform a first phasor-rotated signal transformation on a real component of the coherently accumulated signal and (ii) perform a second phasor-rotated signal transformation on an imaginary component of the coherently accumulated signal; and
an energy calculator configured to determine signal powers of the transformed real and imaginary components of the coherently accumulated signal, wherein:
the received signal is a phasor-rotated signal; and
the first and second phasor-rotated signal transformations perform phasor-derotation of the phasor-rotated signal.

11. The signal processor of claim 10, further comprising a sort engine configured to sort the signal powers to identify at least one of (1) a timing offset of a preamble transmission within the received signal, (2) a spreading code of the preamble transmission, and (3) a signature sequence of the preamble transmission.

12. The signal processor of claim 10, further comprising:
a noncoherent accumulator configured to noncoherently accumulate the signal powers of the real and imaginary components of the transformed signal; and
a sort engine configured to sort the noncoherently accumulated signal powers to identify at least one of (1) a timing offset of a preamble transmission within the received signal, (2) a spreading code of the preamble transmission, and (3) a signature sequence of the preamble transmission.

13. The signal processor of claim 10, wherein:
the received signal includes real and imaginary components; and
the correlation unit comprises at least one sign alteration unit configured to alter the signs of the real and imaginary components of the received signal, based on the value of the spreading code.

14. The signal processor of claim 10, wherein:
the phasor-rotated signal is a transmission signal modulated by a complex phasor signal, and
the first and second phasor-rotated signal transformations are operative to demodulate the phasor-rotated signal to remove the complex phasor signal.

15. The signal processor of claim 14, wherein the signal processor performs the first and second phasor-rotated signal transformations to demodulate the phasor-rotated signal without multiplying the phasor-rotated signal by an inverse of the complex phasor signal.

16. The signal processor of claim 14, wherein:
the complex phasor signal is $$e^{j\left(\frac{\pi}{2}n+\frac{\pi}{4}\right)},$$

where n=0 corresponds to the chip transmitted first in time; and
an inverse of the complex phasor signal is $$e^{-j\left(\frac{\pi}{2}n+\frac{\pi}{4}\right)}.$$

17. The signal processor of claim 10, wherein the first and second phasor-rotated signal transformations are operative both (i) to de-rotate the phasor-rotated signal and (ii) to remove a signature code from the phasor-rotated signal.

18. The signal processor of claim 10, wherein the first and second phasor-rotated signal transformations are operative simultaneously (i) to de-rotate the phasor-rotated signal and (ii) to remove the signature code from the phasor-rotated signal.

* * * * *